US012565325B1

(12) United States Patent
Ricci et al.

(10) Patent No.: US 12,565,325 B1
(45) Date of Patent: Mar. 3, 2026

(54) PROPULSOR REVERSE ROTATION PROTECTION FOR HYBRID-ELECTRIC AIRCRAFT PROPULSION SYSTEMS

(71) Applicant: Pratt & Whitney Canada Corp., Longueuil (CA)

(72) Inventors: Thomas Trevor Ricci, Pointe-Claire (CA); Michael R. Mark, Montreal (CA); Remi Robache, Montreal (CA); Antwan Shenouda, Mississauga (CA); Stephen Minshull, Bromsgrove (GB)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/005,533

(22) Filed: Dec. 30, 2024

(51) Int. Cl.
| | |
|---|---|
| B64D 31/06 | (2024.01) |
| B64D 27/33 | (2024.01) |
| B64D 31/18 | (2024.01) |
| H02P 29/024 | (2016.01) |
| H02P 29/032 | (2016.01) |
| H02P 29/10 | (2016.01) |

(52) U.S. Cl.
CPC ............. B64D 31/06 (2013.01); B64D 27/33 (2024.01); B64D 31/18 (2024.01); H02P 29/024 (2013.01); H02P 29/032 (2016.02); H02P 29/10 (2016.02)

(58) Field of Classification Search
CPC ...... B64D 31/06; B64D 27/026; B64D 27/33; B64D 31/18; H02P 29/02; H02P 29/024; H02P 29/032; H02P 29/10; Y02T 50/60
See application file for complete search history.

(56) References Cited

U.S. PATENT DOCUMENTS

| | | | |
|---|---|---|---|
| 11,932,125 | B2 | 3/2024 | Haldeman |
| 2020/0277078 | A1* | 9/2020 | Smith .................... B64D 27/31 |
| 2021/0094694 | A1 | 4/2021 | Seminel |
| 2021/0095636 | A1 | 4/2021 | Seminel |
| 2021/0354837 | A1* | 11/2021 | Mark ................... H02H 7/0833 |
| 2022/0055743 | A1* | 2/2022 | Kamio ................ B64D 27/357 |
| 2024/0113513 | A1 | 4/2024 | Syed |

* cited by examiner

*Primary Examiner* — Loren C Edwards

(74) *Attorney, Agent, or Firm* — Getz Balich LLC

(57) ABSTRACT

A propulsion system includes a propulsor, an engine, an electrical assembly, and a protection circuit. The engine is coupled with the propulsor. The electrical assembly includes a battery, a motor control unit, an electric motor, and an electrical distribution system. The electrical distribution system is configured to electrically interconnect the battery and the motor control unit. The electrical distribution system includes a contactor between the battery and the motor control unit. The motor control unit is electrically connected with the electric motor. The electric motor is coupled with the propulsor. The protection circuit includes a current sensor configured to measure an electrical current between the battery and the motor control unit. The protection circuit is operable to identify a reverse current flow using the measured electrical current and transmit a protection open control signal to the contactor to control the contactor to switch to an open state.

20 Claims, 5 Drawing Sheets

PROPULSOR REVERSE ROTATION PROTECTION FOR HYBRID-ELECTRIC AIRCRAFT PROPULSION SYSTEMS

TECHNICAL FIELD

This disclosure relates generally to hybrid-electric aircraft propulsion systems and, more particularly, to systems and methods for protecting hybrid-electric aircraft propulsion systems from electric motor reverse rotation.

BACKGROUND OF THE ART

Hybrid-electric propulsion systems for aircraft may typically include one or more electric motors configured to supplement or replace a propulsion system engine (e.g., a gas turbine engine, an intermittent combustion engine, etc.) output to one or more propulsors. Various systems and methods for controlling and providing protective functions for these hybrid-electric aircraft propulsion systems are known. While these known systems and methods may be suitable for their intended purposes, there is always room in the art for improvement.

SUMMARY

According to an aspect of the present disclosure, a propulsion system for an aircraft includes a propulsor, an engine, an electrical assembly, and a reverse rotation protection circuit. The engine includes a rotational assembly. The rotational assembly is coupled with the propulsor. The electrical assembly includes a battery, a motor control unit, an electric motor, and an electrical distribution system. The electrical distribution system is configured to electrically interconnect the battery and the motor control unit. The electrical distribution system includes a contactor electrically connected between the battery and the motor control unit. The contactor is switchable between a closed state and an open state. The motor control unit is electrically connected with the electric motor. The electric motor is coupled with the propulsor. The reverse rotation protection circuit includes a current sensor. The current sensor is configured to measure an electrical current between the battery and the motor control unit. The reverse rotation protection circuit is operable to identify a presence or an absence of a reverse current flow between the battery and the motor control unit using the measured electrical current and, in response to identifying the presence of the reverse current flow, generate and transmit a protection open control signal to the contactor to control the contactor to switch to the open state.

In any of the aspects or embodiments described above and herein, the propulsion system may further include a gear box coupling the rotational assembly and the electric motor to the propulsor.

In any of the aspects or embodiments described above and herein, the electrical assembly may further include a battery management system, the battery management system may include a battery management system (BMS) controller connected in signal communication with the contactor, and the BMS controller may be operable to generate and transmit a BMS open control signal or a BMS close control signal to the contactor.

In any of the aspects or embodiments described above and herein, the reverse rotation protection circuit may be selectively operable in an active state or an inactive state, in the active state the reverse rotation protection circuit may be operable to generate and transmit the protection open control signal in response to identifying the presence of the reverse current flow, and in the inactive state the reverse rotation protection circuit may be operable to permit the reverse current flow between the battery and the motor control unit.

In any of the aspects or embodiments described above and herein, the BMS controller may include a control channel, the control channel may include a processing system including a processor connected in signal communication with a non-transitory memory storing instructions which, when executed by the processor, may cause the processor to charge the battery by, in part, generating and transmitting a charging mode signal to the reverse rotation protection circuit to configure the reverse rotation protection circuit in the inactive state.

In any of the aspects or embodiments described above and herein, the protection open control signal generated and transmitted to the contactor from the reverse rotation protection circuit may control the contactor to switch to the open state with the BMS close control signal applied to the contactor by the BMS controller.

In any of the aspects or embodiments described above and herein, the propulsion system may further include an engine controller connected in signal communication with the contactor and the motor control unit, the engine controller may be operable to generate and transmit a motor open control signal or a motor close control signal to the contactor and, with the contactor in the closed state, control the motor control unit to supply electrical power from the battery to the electric motor to drive rotation of the propulsor in a first rotational direction.

In any of the aspects or embodiments described above and herein, the reverse rotation protection circuit may be selectively operable in an active state or an inactive state, in the active state the reverse rotation protection circuit may be operable to generate and transmit the protection open control signal in response to identifying the presence of the reverse current flow, and in the inactive state the reverse rotation protection circuit may be operable to permit the reverse current flow between the battery and the motor control unit.

In any of the aspects or embodiments described above and herein, the engine controller may include a control channel, the control channel may include a processing system including a processor connected in signal communication with a non-transitory memory storing instructions which, when executed by the processor, may cause the processor to generate and transmit an inactivation signal to the reverse rotation protection circuit to configure the reverse rotation protection circuit in the inactive state and control the motor control unit to supply electrical power from the battery to the electric motor to drive rotation of the propulsor in a second rotational direction opposite the first rotational direction.

In any of the aspects or embodiments described above and herein, the protection open control signal generated and transmitted to the contactor from the reverse rotation protection circuit may control the contactor to switch to the open state with the motor close control signal applied to the contactor by the engine controller.

According to another aspect of the present disclosure, a propulsion system for an aircraft includes a propulsor, an engine, an electrical assembly, a controller, and a reverse rotation protection circuit. The engine includes a rotational assembly. The rotational assembly is coupled with the propulsor. The electrical assembly includes a battery, a motor control unit, an electric motor, and an electrical distribution system. The electrical distribution system is configured to electrically interconnect the battery and the motor control unit. The electrical distribution system includes a contactor electrically connected between the battery and the motor control unit. The contactor is switchable between a closed state and an open state. The motor control unit is electrically connected with the electric motor. The electric motor is coupled with the propulsor. The controller is connected in signal communication with the contactor. The controller includes at least one control channel. The at least one control channel includes a processing system including a processor connected in signal communication with a non-transitory memory including instructions which, when executed by the processor, cause the processor to control the contactor in the closed state or the open state by generating and transmitting an open control signal or a close control signal to the contactor, respectively. The reverse rotation protection circuit includes a current sensor. The current sensor is configured to measure an electrical current between the battery and the motor control unit. The reverse rotation protection circuit is operable to identify a presence or an absence of a reverse current flow between the battery and the motor control unit using the measured electrical current and, in response to identifying the presence of the reverse current flow, generate and transmit a protection open control signal to the contactor to control the contactor to switch to the open state with the controller generating and transmitting either of the open control signal or the close control signal.

In any of the aspects or embodiments described above and herein, the reverse rotation protection circuit may be selectively operable in an active state or an inactive state, in the active state the reverse rotation protection circuit may be operable to generate and transmit the protection open control signal in response to identifying the presence of the reverse current flow, and in the inactive state the reverse rotation protection circuit may be operable to permit the reverse current flow between the battery and the motor control unit.

In any of the aspects or embodiments described above and herein, the controller may be connected in signal communication with the reverse rotation protection circuit and the instructions, when executed by the processor, may further cause the processor to generate and transmit an inactivation signal to the reverse rotation protection circuit to configure the reverse rotation protection circuit in the inactive state.

According to another aspect of the present disclosure, a propulsion system for an aircraft includes a propulsor, an engine, an electrical assembly, and a reverse rotation protection circuit. The engine includes a rotational assembly and a gear box. The rotational assembly includes a bladed turbine rotor and a shaft connected to the bladed turbine rotor. The shaft is coupled with the propulsor by the gear box. The electrical assembly includes a battery, an electric motor, and an electrical distribution system. The electrical distribution system is configured to electrically interconnect the battery and the electric motor. The electrical distribution system includes a contactor electrically connected between the battery and the electric motor. The contactor is switchable between a closed state and an open state. The electric motor includes a rotor coupled with the propulsor by the gear box. The reverse rotation protection circuit includes a current sensor. The current sensor is configured to measure an electrical current between the battery and the motor control unit. The reverse rotation protection circuit is operable to identify a presence or an absence of a reverse current flow between the battery and the motor control unit using the measured electrical current and, in response to identifying the presence of the reverse current flow, generate and transmit a protection open control signal to the contactor to control the contactor to switch to the open state.

In any of the aspects or embodiments described above and herein, the electrical assembly may further include a battery management system, the battery management system may include a battery management system (BMS) controller connected in signal communication with the contactor, and the BMS controller may be operable to generate and transmit a BMS open control signal or a BMS close control signal to the contactor.

In any of the aspects or embodiments described above and herein, the reverse rotation protection circuit may be selectively operable in an active state or an inactive state, in the active state the reverse rotation protection circuit may be operable to generate and transmit the protection open control signal in response to identifying the presence of the reverse current flow, and in the inactive state the reverse rotation protection circuit may be operable to permit the reverse current flow between the battery and the motor control unit.

In any of the aspects or embodiments described above and herein, the BMS controller may include a control channel, the control channel may include a processing system including a processor connected in signal communication with a non-transitory memory storing instructions which, when executed by the processor, may cause the processor to charge the battery by, in part, generating and transmitting a charging mode signal to the reverse rotation protection circuit to configure the reverse rotation protection circuit in the inactive state.

In any of the aspects or embodiments described above and herein, the electrical distribution system may further include a second contactor electrically connected between the battery and the electric motor, the second contactor may be switchable between a second closed state and a second open state, the propulsion system further may further include an engine controller connected in signal communication with the second contactor, and the engine controller may be operable to generate and transmit a motor open control signal or a motor close control signal to the second contactor.

In any of the aspects or embodiments described above and herein, the reverse rotation protection circuit may be further operable to, in response to identifying the presence of the reverse current flow, generate and transmit the protection open control signal to the second contactor to control the second contactor to switch to the second open state.

In any of the aspects or embodiments described above and herein, the protection open control signal generated and transmitted to the second contactor from the reverse rotation protection circuit may control the second contactor to switch to the second open state with the motor close control signal applied to the contactor by the engine controller.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
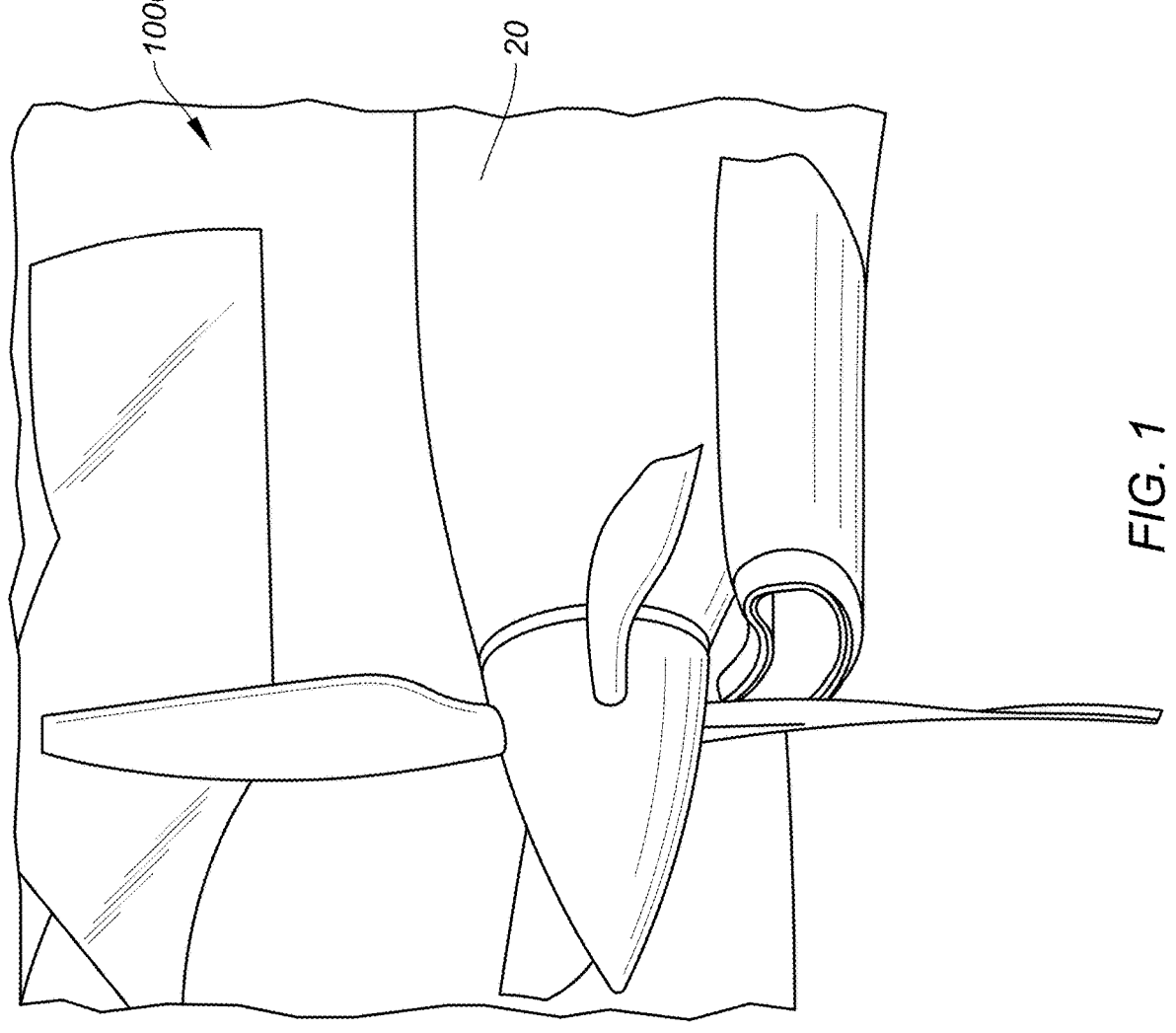
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
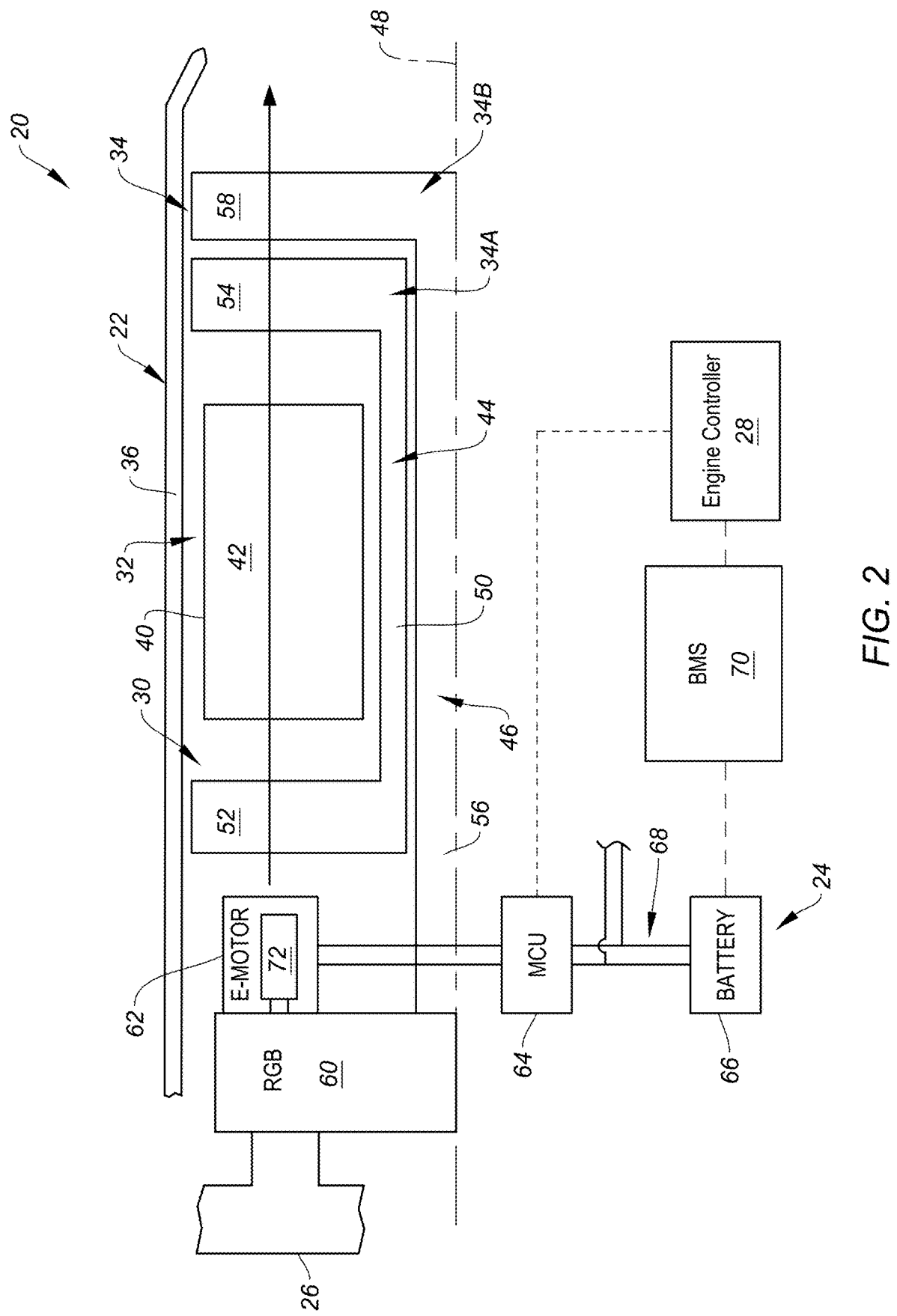
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes an engine 22, an electrical assembly 24, a propulsor 26, and an engine controller 28. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Aspects of the present disclosure may be equally applicable to aircraft propulsion systems including other engine configurations such as, but not limited to, rotary engines, piston engines, and the like, or to electric aircraft propulsion systems (e.g., battery-electric propulsion systems, fuel-cell-electric propulsion systems, etc.). Aspects of the present disclosure may also be equally applicable to aircraft engines (e.g., aircraft powerplants) which are not part of a propulsion system, for example, an engine for an auxiliary power unit (APU).

The engine 22 of FIG. 2 includes a compressor section 30, a combustor section 32, a turbine section 34, and an engine static structure 36. The combustor section 32 includes a combustor 40 (e.g., an annular combustor). The combustor 40 forms a combustion chamber 42. The turbine section 34 includes a high-pressure turbine 34A and a power turbine 34B.

Components of the compressor section 30 and the turbine section 34 of FIG. 2 form a first rotational assembly 44 (e.g., a high-pressure spool) and a second rotational assembly 46 of the engine 22. The first rotational assembly 44 and the second rotational assembly 46 are mounted for rotation about a rotational axis 48 (e.g., an axial centerline) of the engine 22 relative to the engine static structure 36.

The first rotational assembly 44 includes a first shaft 50, a bladed compressor rotor 52 for the compressor section 30, and a bladed first turbine rotor 54 for the high-pressure turbine 34A. The first shaft 50 interconnects the bladed compressor rotor 52 and the bladed first turbine rotor 54.

The second rotational assembly 46 of FIG. 2 includes a second shaft 56 and a bladed second turbine rotor 58 for the power turbine 34B. The second shaft 56 is connected to the bladed second turbine rotor 58. The second shaft 56 operably connects (e.g., directly or indirectly connects) the bladed second turbine rotor 58 with the propulsor 26. For example, the second shaft 56 of FIG. 2 is coupled with the propulsor 26 by a gear box 60 (e.g., a reduction gear box (RGB)). The gear box 60 includes a gear assembly (e.g., an epicyclic gear assembly) coupling the second shaft 56 and the propulsor 26. The gear assembly may be a reduction gear assembly configured to drive rotation of the propulsor 26 at a reduced rotational speed relative to the second shaft 56. Of course, the second shaft 56 may alternatively be directly connected to the propulsor 26 to drive the propulsor 26 at the same rotational speed as the second shaft 56.

The engine static structure 36 includes engine casings, cowlings, and other fixed (e.g., non-rotating) structures of the engine 22 which house and/or support components of the engine 22 such as, but not limited to, those of the compressor section 30, the combustor section 32, and the turbine section 34. The engine static structure 36 includes one or more bearing assemblies and/or gear trains configured to rotationally support and/or interconnect components of the first rotational assembly 44 and the second rotational assembly 46.

The electrical assembly 24 of FIG. 2 includes an electric motor 62, a motor control unit (MCU) 64, a battery 66, an electrical distribution system 68, and a battery management system (BMS) 70. The electric motor 62 includes a rotor 72. The rotor 72 is coupled to the propulsor 26 by the gear box 60. For example, the gear box 60 may couple both of the second shaft 56 and the rotor 72 to the propulsor 26 to facilitate driving rotation of the propulsor 26 with the bladed second turbine rotor 58 (e.g., via the second shaft 56), the electric motor 62 (e.g., the rotor 72), or a combination of the bladed second turbine rotor 58 and the electric motor 62. The motor control unit 64 is electrically connected with and between the electric motor 62 and the electrical distribution system 68. The motor control unit 64 is configured to control electric power characteristics (e.g., frequency, voltage, current) supplied to the electric motor 62 (e.g., windings of the electric motor 62), for example, to control a rotation speed and/or torque of the rotor 72. The battery 66 is electrically connected to the electrical distribution system 68. The battery 66 is configured to selectively supply electrical power to the electrical distribution system 68 independently (e.g., as a single power source for the electrical assembly 24) or in combination with one or more other electrical power sources (e.g., an electrical generator). The battery 66 may include a plurality of battery strings, battery sub-strings, battery modules, battery cells, and/or the like electrically connected together in series and/or parallel as necessary to configure the battery 66 with the desired electrical characteristics (e.g., voltage output, current output, storage capacity, etc.) for the aircraft 1000. The present disclosure is not limited to any particular configuration of the battery 66. The battery 66 (e.g., and its battery cells) may be configured as a rechargeable battery having a battery chemistry such as, but not limited to, lead acid, nickel cadmium (NiCd), nickel-metal hydride (Ni-MH), lithium-ion (Li-ion), lithium-polymer (Li-poly), lithium metal, and the like. The electrical distribution system 68 electrically interconnects components of the electrical assembly 24. The electrical distribution system 68 includes switchgear, cables, wires, breakers, switches, contactors, electrical power conditional and/or conversion (e.g., AC to DC or DC to AC conversion) components, and/or other electrical components to effect the transfer of electrical power between components of the electrical assembly 24. The electrical distribution system 68 may additionally be electrically connected with other electric power sources (e.g., an electrical generator) of the electrical assembly 24. The electrical distribution system 68 may additionally include one or more electrical power controllers, for example, to control a magnitude and/or direction of electrical current flow to components of the electrical assembly 24.

The engine controller 28 is configured to control operating parameters of the engine 22 such as, but not limited to, fuel flow to the combustor 40, stator vane position (e.g., variable compressor inlet guide vane (IGV) position), compressor air bleed valve position, shaft (e.g., first shaft 50 and/or second shaft 56) torque and/or rotation speed, electric motor 62 operation (e.g., through the motor control unit 64), etc. so as to control an engine power or performance of the propulsion system 20. In some embodiments, the engine controller 28 may be part of a full authority digital engine control (FADEC) system for the propulsion system 20 and its engine 22.

During operation of the propulsion system 20 of FIG. 2, ambient air enters the propulsion system 20 through an air intake into and through a core flow path of the engine 22. The ambient air flow along the core flow path is compressed in the compressor section 30, by rotation of the bladed compressor rotor 52, and directed into the combustor 40. Fuel is injected into the combustor 40 and mixed with the compressed air to provide a fuel-air mixture. This fuel-air mixture is combusted in the combustion chamber 42, and the resultant combustion gas is directed through the high-pressure turbine 34A and the power turbine 34B and subsequently exhausted from the propulsion system 20. The bladed first turbine rotor 54 and the bladed second turbine rotor 58 rotationally drive the first rotational assembly 44 and the second rotational assembly 46, respectively, in response to the combustion gas flow through the high-pressure turbine 34A and the power turbine 34B. The second rotational assembly 46 (e.g., the second shaft 56) may drive rotation of the propulsor 26, for example, through the gear box 60. The electric motor 62 may be selectively operated (e.g., by the engine controller 28 through the motor control unit 64) to drive rotation of the propulsor 26 independently or in combination with the engine 22 through the gear box 60.

Figure 3:
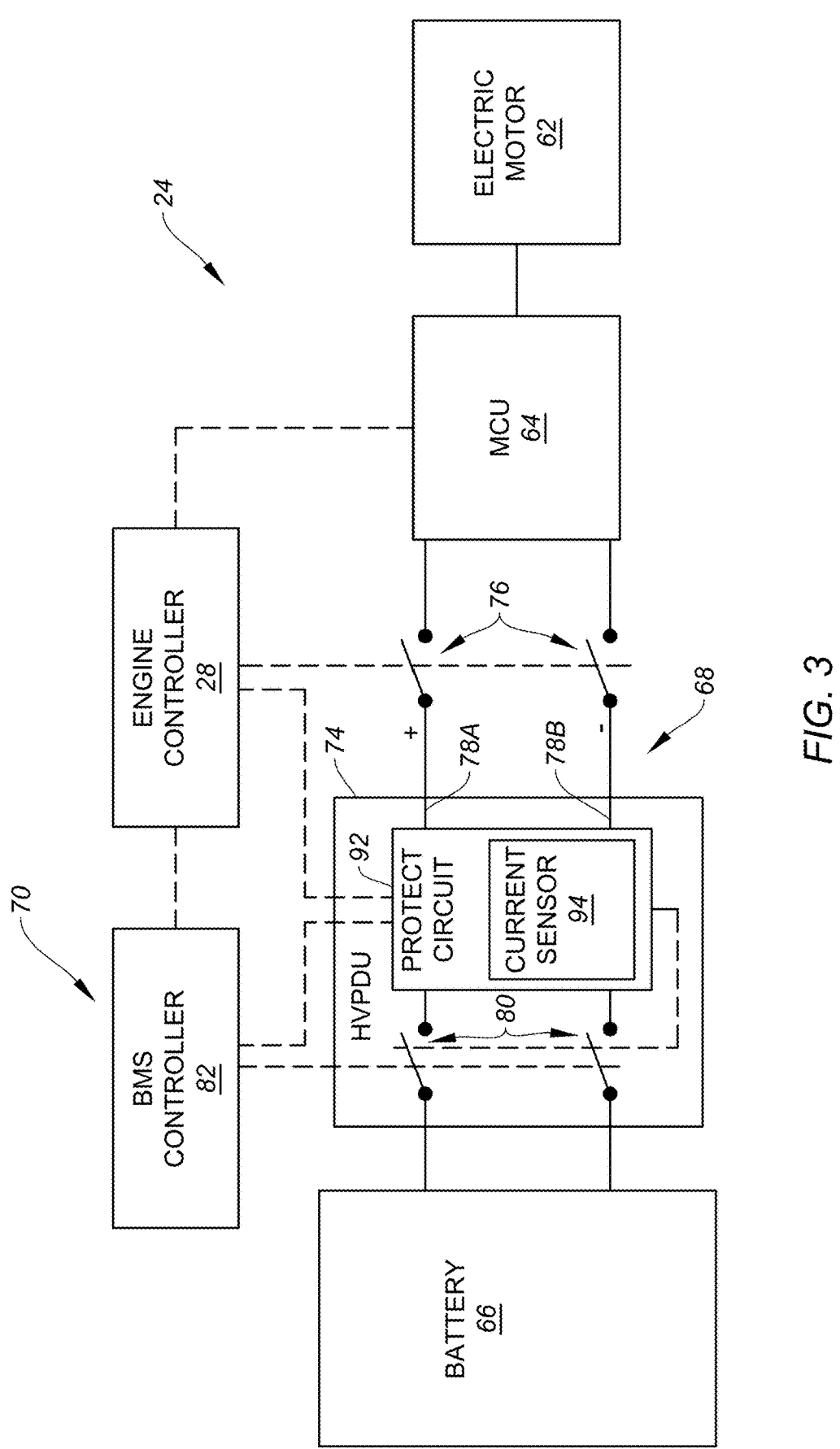
FIG. 3 schematically illustrates an electrical assembly of the aircraft propulsion system including a reverse rotation protection circuit, in accordance with one or more embodiments of the present disclosure.

FIG. 3 schematically illustrates the electrical assembly 24 and the engine controller 28 in greater detail. The electrical distribution system 68 of FIG. 3 includes a high-voltage power distribution unit (HVPDU) 74 and one or more electric motor contactors 76. The HVPDU 74 includes a positive battery line 78A, a negative battery line 78B, and one or more battery contactors 80. The HVPDU 74 includes the battery contactors 80 on the positive battery line 78A and the negative battery line 78B to facilitate selective control of electrical current flow through the HVPDU 74. The present disclosure, however, is not limited to the foregoing exemplary configuration of the HVPDU 74 of FIG. 3, and the HVPDU 74 may alternatively include different arrangements of the battery contactors 80 or other electrical interruption devices (e.g., switches, breakers, etc.), subdivisions of the battery 66 (e.g., parallel battery strings), and the like. The electric motor contactors 76 of FIG. 3 are electrically connected with and between the HVPDU 74 (e.g., the positive battery line 78A and the negative battery line 78B) and the motor control unit 64 to facilitate selective energization or deenergization of the electric motor 62. The contactors 76, 80 are selectively configurable (e.g., switchable) in and between a closed state or an open state to conduct or interrupt an electrical current flow, respectively. The contactors 76, 80 may include electrically controlled relays or switches which may be controlled by an electrical control signal to position the respective contactors in the open state or the closed state.

The engine controller 28 is connected in signal communication with the electric motor contactors 76. The engine controller 28 is configured to control (e.g., position) the electric motor contactors 76 in their respective closed states and open states to energize or deenergize the electric motor 62. The battery management system 70 includes a battery management system (BMS) controller 82. The BMS controller 82 is connected in signal communication with the battery contactors 80. The BMS controller 82 is configured to control (e.g., position) the battery contactors 80 in their respective closed states and open states to energize or deenergize the electric motor 62 and/or other electrical loads, or to facilitate electrical isolation of the battery 66 or subdivisions (e.g., battery strings) of the battery 66 in response to an electrical fault, fire, or other condition.

Figure 4:
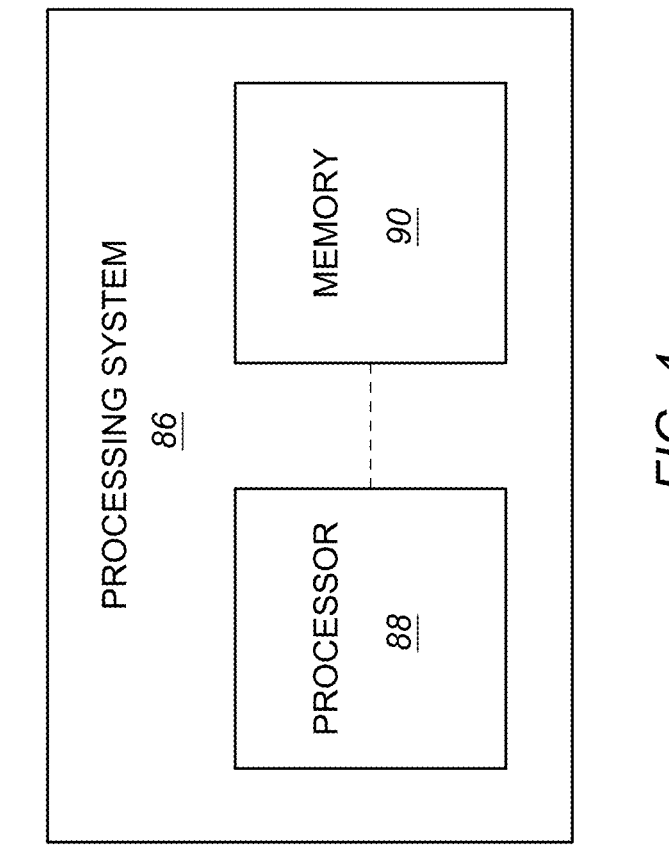
FIG. 4 schematically illustrates a control channel for a controller, in accordance with one or more embodiments of the present disclosure.

Referring briefly to FIG. 4, the engine controller 28 and the BMS controller 82 each include at least one control channel 84. Each control channel 84 includes a discrete processing system 86. The processing system 86 includes a processor 88 connected in signal communication with memory 90. The processor 88 may include any type of computing device, computational circuit, processor(s), central processing unit (CPU), graphics processing unit (GPU), computer, or the like capable of executing a series of instructions that are stored in memory 90. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the control channel 84 (e.g., of the engine controller 28 or the BMS controller 82) to accomplish the same algorithmically and/or coordination of electrical assembly 24 components. The memory 90 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly and/or indirectly coupled to the engine controller 28 or the BMS controller 82. The processing system 86 may include, or may be in communication with, a user interface including one or more inputs devices and/or one or more output devices, for example, an input device that enables a user to enter data and/or instructions and an output device configured to display information (e.g., a visual display or a printer), or to transfer data, etc. Communications between the processing system 86 and external electrical or electronic devices may be via a hardwire connection or via a wireless connection. A person of skill in the art will recognize that portions of the processing system 86 may assume various forms (e.g., digital signal processor, analog device, etc.).

During flight conditions, takeoff, and other propulsion system operations requiring forward thrust for the aircraft 1000 (see FIG. 1), the propulsor 26 is typically driven by operation of the engine 22 and/or the electric motor 62 to rotate in a single rotational direction. In some rare occurrences, for example due to a hardware failure or software fault of the motor control unit 64, the electric motor 62 may be unintentionally driven in reverse rotation. In other words, the electric motor 62 (e.g., the rotor 72) may rotate in opposition to the forward-thrust rotational direction of the propulsor 26 and/or in opposition to the rotational direction of the engine 22 (e.g., the second shaft 56). If left unaddressed, reverse rotation of the electric motor 62 may very quickly lead to loss of propulsion control and/or damage to one or both of the engine 22 or the electric motor 62.

The electrical assembly 24 (e.g., the HVPDU 74) of FIG. 3 further includes a reverse rotation protection circuit 92. The reverse rotation protection circuit 92 includes an electrical current sensor 94 electrically connected to and operable to measure an electrical current along one or both of the positive battery line 78A or the negative battery line 78B. The reverse rotation protection circuit 92 is operable to identify a presence or an absence of a reverse current flow, for example through the HVPDU 74 (e.g., along the battery lines 78A, 78B), measured using the current sensor 94. As used herein, the reverse current flow may be understood as a current flow through the HVPDU 74 which is opposite a predetermined current flow direction associated with rotation of the electric motor 62 (e.g., the rotor 72) to drive rotation of the propulsor 26 to generate, alone or in combination with the engine 22, forward thrust for the propulsion system 20 and the aircraft 1000. The reverse rotation protection circuit 92 is connected in signal communication with the battery contactors 80. In response to identification of the presence of reverse current flow, the reverse rotation protection circuit 92 is operable to generate and transmit an open control signal to the battery contactors 80 to control (e.g., position) the battery contactors 80 in their respective open states to deenergize the electric motor 62. The open control signal from the reverse rotation protection circuit 92 may cause the battery contactors 80 to switch from their closed states to their open states independent of any control signal (e.g., a close control signal) from the BMS controller 82 to the battery contactors 80.

Figure 5:
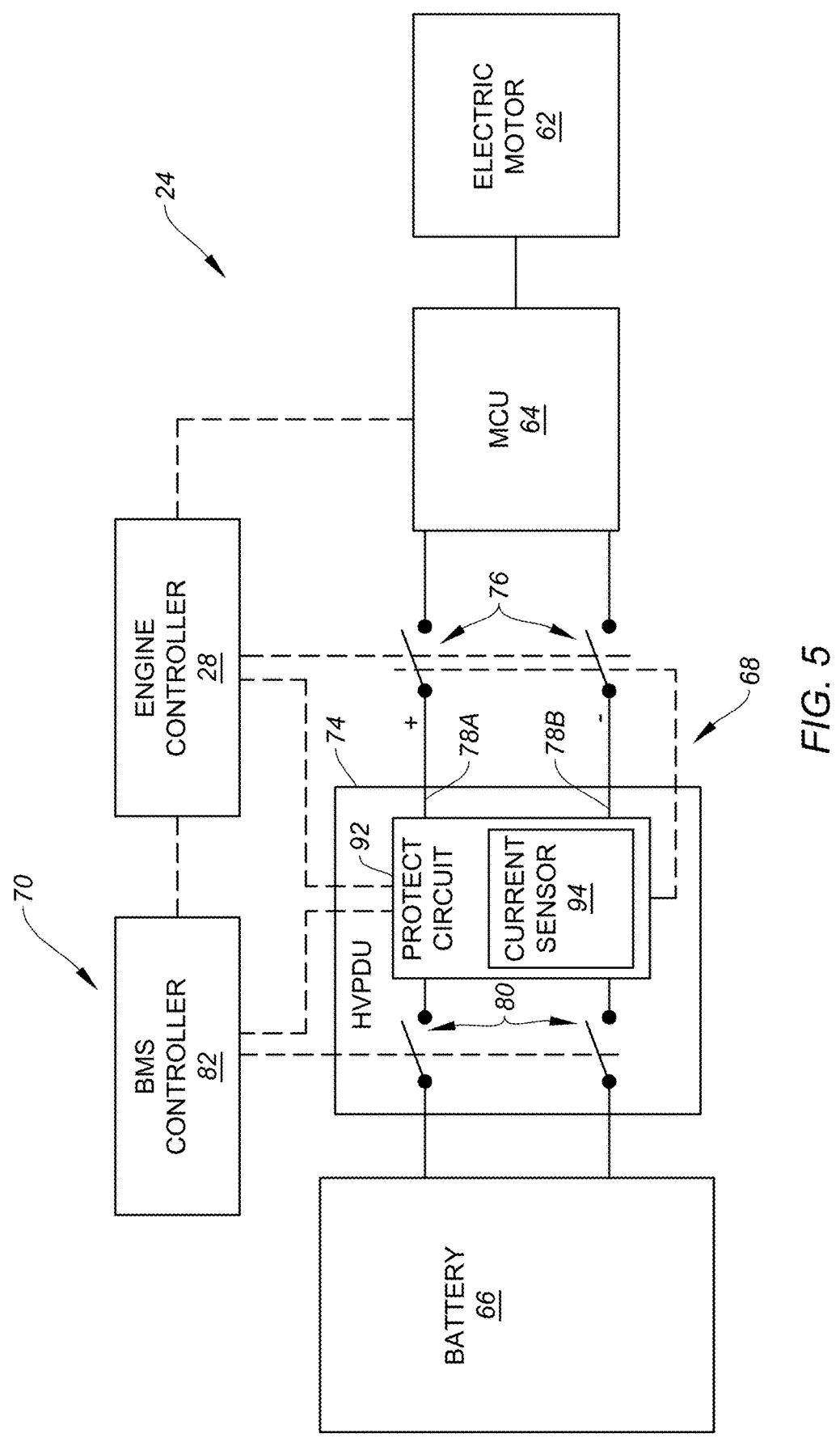
FIG. 5 schematically illustrates another electrical assembly of the aircraft propulsion system including a reverse rotation protection circuit, in accordance with one or more embodiments of the present disclosure.

As shown in FIG. 5, in some embodiments, the reverse rotation protection circuit 92 may alternatively be connected in signal communication with the electric motor contactors 76. In response to identification of the presence of reverse current flow, the reverse rotation protection circuit 92 may be operable to generate and transmit an open control signal to the electric motor contactors 76 to control (e.g., position) the electric motor contactors 76 in their respective open states to deenergize the electric motor 62. The open control signal from the reverse rotation protection circuit 92 may cause the electric motor contactors 76 to switch from their closed states to their open states independent of any control signal (e.g., a close control signal) from the engine controller 28 to the electric motor contactors 76. In some embodiments, the reverse rotation protection circuit 92 may be connected in signal communication with both the electric motor contactors 76 and the battery contactors 80 to control the electric motor contactors 76 and the battery contactors 80 as described above.

The reverse rotation protection circuit 92 may be selectively operable in an active state or an inactive state. In the active state, the reverse rotation protection circuit 92 may operate as described above to control the battery contactors 80 (and/or the electric motor contactors 76) to open in response to identification of the presence of reverse current flow, as described above. In the inactive state, the reverse rotation protection circuit 92 may permit reverse current flow, for example, through the HVPDU 74 (e.g., between the battery 66 and the motor control unit 64). In other words, in the inactive state, the reverse rotation protection circuit 92 may not generate and transmit the open control signal to the battery contactors 80 (and/or the electric motor contactors 76). In one example, the BMS controller 82 may control a charging sequence for the battery 66. During the charging sequence, the BMS controller 82 may, in part, generate and transmit a charging mode signal (e.g., an inactivation signal) to the reverse rotation protection circuit 92 to configure the reverse rotation protection circuit 92 in the inactive state, thereby allowing reverse current flow through the HVPDU 74 (e.g., from the electric motor 62 in a generating mode, a discrete electrical generator, or a ground-based charger) to facilitate charging of the battery 66. In another example, the engine controller 28 may transmit an inactivation signal to the reverse rotation protection circuit 92 to configure the reverse rotation protection circuit 92 in the inactive state, for example, when reverse rotation of the propulsor 26 is necessary or when the electric motor 62 is deenergized (e.g., the engine controller 28 has controlled the electric motor contactors 76 to switch to their open states).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the propulsion system comprising:

a propulsor;

an engine including a rotational assembly, the rotational assembly coupled with the propulsor;

an electrical assembly including a battery, a motor control unit, an electric motor, and an electrical distribution system, the electrical distribution system configured to electrically interconnect the battery and the motor control unit, the electrical distribution system including a contactor electrically connected between the battery and the motor control unit, the contactor switchable between a closed state and an open state, the motor control unit electrically connected with the electric motor, the electric motor coupled with the propulsor; and a reverse rotation protection circuit including a current sensor, the current sensor configured to measure an electrical current between the battery and the motor control unit, the reverse rotation protection circuit operable to identify a presence or an absence of a reverse current flow between the battery and the motor control unit using the measured electrical current and, in response to identifying the presence of the reverse current flow, generate and transmit a protection open control signal to the contactor to control the contactor to switch to the open state.

2. The propulsion system of claim 1, further comprising a gear box coupling the rotational assembly and the electric motor to the propulsor.

3. The propulsion system of claim 1, wherein the electrical assembly further includes a battery management system, the battery management system includes a battery management system (BMS) controller connected in signal communication with the contactor, the BMS controller operable to generate and transmit a BMS open control signal or a BMS close control signal to the contactor.

4. The propulsion system of claim 3, wherein the reverse rotation protection circuit is selectively operable in an active state or an inactive state, in the active state the reverse rotation protection circuit is operable to generate and transmit the protection open control signal in response to identifying the presence of the reverse current flow, and in the inactive state the reverse rotation protection circuit is operable to permit the reverse current flow between the battery and the motor control unit.

5. The propulsion system of claim 4, wherein the BMS controller includes a control channel, the control channel includes a processing system including a processor connected in signal communication with a non-transitory memory storing instructions which, when executed by the processor, cause the processor to:

charge the battery by, in part, generating and transmitting a charging mode signal to the reverse rotation protection circuit to configure the reverse rotation protection circuit in the inactive state.

6. The propulsion system of claim 3, wherein the protection open control signal generated and transmitted to the contactor from the reverse rotation protection circuit controls the contactor to switch to the open state with the BMS close control signal applied to the contactor by the BMS controller.

7. The propulsion system of claim 1, further comprising an engine controller connected in signal communication with the contactor and the motor control unit, the engine controller operable to generate and transmit a motor open control signal or a motor close control signal to the contactor and, with the contactor in the closed state, control the motor control unit to supply electrical power from the battery to the electric motor to drive rotation of the propulsor in a first rotational direction.

8. The propulsion system of claim 7, wherein the reverse rotation protection circuit is selectively operable in an active state or an inactive state, in the active state the reverse rotation protection circuit is operable to generate and transmit the protection open control signal in response to identifying the presence of the reverse current flow, and in the inactive state the reverse rotation protection circuit is operable to permit the reverse current flow between the battery and the motor control unit.

9. The propulsion system of claim 8, wherein the engine controller includes a control channel, the control channel includes a processing system including a processor connected in signal communication with a non-transitory memory storing instructions which, when executed by the processor, cause the processor to:

generate and transmit an inactivation signal to the reverse rotation protection circuit to configure the reverse rotation protection circuit in the inactive state, and control the motor control unit to supply electrical power from the battery to the electric motor to drive rotation of the propulsor in a second rotational direction opposite the first rotational direction.

10. The propulsion system of claim 7, wherein the protection open control signal generated and transmitted to the contactor from the reverse rotation protection circuit controls the contactor to switch to the open state with the motor close control signal applied to the contactor by the engine controller.

11. A propulsion system for an aircraft, the propulsion system comprising:

a propulsor;

an engine including a rotational assembly, the rotational assembly coupled with the propulsor;

an electrical assembly including a battery, a motor control unit, an electric motor, and an electrical distribution system, the electrical distribution system configured to electrically interconnect the battery and the motor control unit, the electrical distribution system including a contactor electrically connected between the battery and the motor control unit, the contactor switchable between a closed state and an open state, the motor control unit electrically connected with the electric motor, the electric motor coupled with the propulsor;

a controller connected in signal communication with the contactor, the controller including at least one control channel, the at least one control channel including a processing system including a processor connected in signal communication with a non-transitory memory including instructions which, when executed by the processor, cause the processor to:

control the contactor in the closed state or the open state by generating and transmitting an open control signal or a close control signal to the contactor, respectively; and a reverse rotation protection circuit including a current sensor, the current sensor configured to measure an electrical current between the battery and the motor control unit, the reverse rotation protection circuit operable to identify a presence or an absence of a reverse current flow between the battery and the motor control unit using the measured electrical current and, in response to identifying the presence of the reverse current flow, generate and transmit a protection open control signal to the contactor to control the contactor to switch to the open state with the controller generating and transmitting either of the open control signal or the close control signal.

12. The propulsion system of claim 11, wherein the reverse rotation protection circuit is selectively operable in an active state or an inactive state, in the active state the reverse rotation protection circuit is operable to generate and transmit the protection open control signal in response to identifying the presence of the reverse current flow, and in the inactive state the reverse rotation protection circuit is operable to permit the reverse current flow between the battery and the motor control unit.

13. The propulsion system of claim 12, wherein the controller is connected in signal communication with the reverse rotation protection circuit and the instructions, when executed by the processor, further cause the processor to:

generate and transmit an inactivation signal to the reverse rotation protection circuit to configure the reverse rotation protection circuit in the inactive state.

14. A propulsion system for an aircraft, the propulsion system comprising:

a propulsor;

an engine including a rotational assembly and a gear box, the rotational assembly including a bladed turbine rotor and a shaft connected to the bladed turbine rotor, the shaft coupled with the propulsor by the gear box;

an electrical assembly including a battery, an electric motor, and an electrical distribution system, the electrical distribution system configured to electrically interconnect the battery and the electric motor, the electrical distribution system including a contactor electrically connected between the battery and the electric motor, the contactor switchable between a closed state and an open state, the electric motor including a rotor coupled with the propulsor by the gear box; and a reverse rotation protection circuit including a current sensor, the current sensor configured to measure an electrical current between the battery and a motor control unit, the reverse rotation protection circuit operable to identify a presence or an absence of a reverse current flow between the battery and the motor control unit using the measured electrical current and, in response to identifying the presence of the reverse current flow, generate and transmit a protection open control signal to the contactor to control the contactor to switch to the open state.

15. The propulsion system of claim 14, wherein the electrical assembly further includes a battery management system, the battery management system includes a battery management system (BMS) controller connected in signal communication with the contactor, the BMS controller operable to generate and transmit a BMS open control signal or a BMS close control signal to the contactor.

16. The propulsion system of claim 15, wherein the reverse rotation protection circuit is selectively operable in an active state or an inactive state, in the active state the reverse rotation protection circuit is operable to generate and transmit the protection open control signal in response to identifying the presence of the reverse current flow, and in the inactive state the reverse rotation protection circuit is operable to permit the reverse current flow between the battery and the motor control unit.

17. The propulsion system of claim 16, wherein the BMS controller includes a control channel, the control channel includes a processing system including a processor connected in signal communication with a non-transitory memory storing instructions which, when executed by the processor, cause the processor to:

charge the battery by, in part, generating and transmitting a charging mode signal to the reverse rotation protection circuit to configure the reverse rotation protection circuit in the inactive state.

18. The propulsion system of claim 15, wherein the electrical distribution system further includes a second contactor electrically connected between the battery and the electric motor, the second contactor is switchable between a second closed state and a second open state, the propulsion system further comprising an engine controller connected in signal communication with the second contactor, the engine controller operable to generate and transmit a motor open control signal or a motor close control signal to the second contactor.

19. The propulsion system of claim 18, wherein the reverse rotation protection circuit is further operable to, in response to identifying the presence of the reverse current flow, generate and transmit the protection open control signal to the second contactor to control the second contactor to switch to the second open state.

20. The propulsion system of claim 18, wherein the protection open control signal generated and transmitted to the second contactor from the reverse rotation protection circuit controls the second contactor to switch to the second open state with the motor close control signal applied to the contactor by the engine controller.

\* \* \* \* \*